United States Patent
McFarland, II et al.

(10) Patent No.: US 11,932,975 B2
(45) Date of Patent: Mar. 19, 2024

(54) KNITTED COMPONENT HAVING AT LEAST ONE THERMOPLASTIC POLYMER ELEMENT

(71) Applicant: Nike, Inc., Beaverton, OR (US)

(72) Inventors: William C. McFarland, II, Beaverton, OR (US); Leah Resneck, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/098,483

(22) Filed: Jan. 18, 2023

(65) Prior Publication Data

US 2023/0323574 A1  Oct. 12, 2023

Related U.S. Application Data

(63) Continuation of application No. 16/735,272, filed on Jan. 6, 2020, now Pat. No. 11,560,652, which is a continuation of application No. 15/431,940, filed on Feb. 14, 2017, now Pat. No. 10,524,530.

(60) Provisional application No. 62/301,436, filed on Feb. 29, 2016, provisional application No. 62/295,889, filed on Feb. 16, 2016.

(51) Int. Cl.
   *D04B 1/24* (2006.01)
   *A43B 1/04* (2022.01)
   *D04B 1/16* (2006.01)

(52) U.S. Cl.
   CPC ............... *D04B 1/24* (2013.01); *A43B 1/04* (2013.01); *D04B 1/16* (2013.01); *D10B 2401/041* (2013.01); *D10B 2403/0114* (2013.01); *D10B 2403/023* (2013.01); *D10B 2403/032* (2013.01); *D10B 2501/043* (2013.01); *D10B 2501/061* (2013.01)

(58) Field of Classification Search
   CPC .... D04B 1/24; D04B 1/16; A43B 1/04; A43B 23/0215; A43B 23/0255; A43B 23/026
   See application file for complete search history.

(56) References Cited

U.S. PATENT DOCUMENTS

| | | |
|---|---|---|
| 2,147,197 A | 2/1939 | Glidden |
| 4,204,346 A | 5/1980 | Fugere |
| 4,222,183 A | 9/1980 | Haddox |
| 4,447,967 A | 5/1984 | Zaino |

(Continued)

FOREIGN PATENT DOCUMENTS

| | | |
|---|---|---|
| CN | 103561605 A | 2/2014 |
| CN | 104026794 A | 9/2014 |

(Continued)

*Primary Examiner* — Danny Worrell
(74) *Attorney, Agent, or Firm* — Shook, Hardy & Bacon L.L.P.

(57) ABSTRACT

An upper may include a plurality of knit elements linked together by a molded thermoplastic polymer element comprising a thermoplastic polymer, each of the knit elements being discrete, where each of the knit elements comprises a border that is at least partially surrounded by the molded thermoplastic polymer element. Further, an article of footwear may include a plurality of knit elements linked together by a molded thermoplastic polymer element comprising a thermoplastic polymer, each of the knit elements being discrete, where each of the knit elements comprises a border that is at least partially surrounded by the molded thermoplastic polymer element.

18 Claims, 5 Drawing Sheets

(56) References Cited

U.S. PATENT DOCUMENTS

| | | |
|---|---|---|
| 6,910,288 B2 | 6/2005 | Dua |
| 6,931,762 B1 | 8/2005 | Dua |
| 7,347,011 B2 | 3/2008 | Dua et al. |
| 9,145,629 B2 | 9/2015 | Podhajny |
| 10,524,530 B2 | 1/2020 | Mcfarland et al. |
| 11,560,652 B2 * | 1/2023 | McFarland, II ......... A43B 1/04 |
| 2004/0118018 A1 | 6/2004 | Dua |
| 2010/0154256 A1 | 6/2010 | Dua |
| 2010/0199406 A1 | 8/2010 | Dua et al. |
| 2012/0246973 A1 | 10/2012 | Dua |
| 2013/0260104 A1 | 10/2013 | Dua et al. |
| 2014/0059886 A1 | 3/2014 | Lyttle et al. |
| 2014/0150292 A1 | 6/2014 | Podhajny et al. |
| 2014/0237861 A1 | 8/2014 | Podhajny |
| 2015/0359290 A1 | 12/2015 | Podhajny et al. |
| 2016/0058100 A1 | 3/2016 | Dealey et al. |
| 2017/0245581 A1 | 8/2017 | Mcfarland et al. |
| 2018/0116327 A9 | 5/2018 | Mcfarland et al. |
| 2020/0141035 A1 | 5/2020 | Mcfarland et al. |

FOREIGN PATENT DOCUMENTS

| | | |
|---|---|---|
| CN | 104106874 A | 10/2014 |
| CN | 104106883 A | 10/2014 |
| CN | 203960501 U | 11/2014 |
| CN | 104363782 A | 2/2015 |
| CN | 104754976 A | 7/2015 |
| CN | 204697972 U | 10/2015 |
| CN | 105077847 A | 11/2015 |
| CN | 204888862 U | 12/2015 |
| EP | 2805638 A1 | 11/2014 |
| WO | 2012/138488 A2 | 10/2012 |
| WO | 2014/036124 A1 | 3/2014 |
| WO | 2015/011148 A1 | 1/2015 |

* cited by examiner

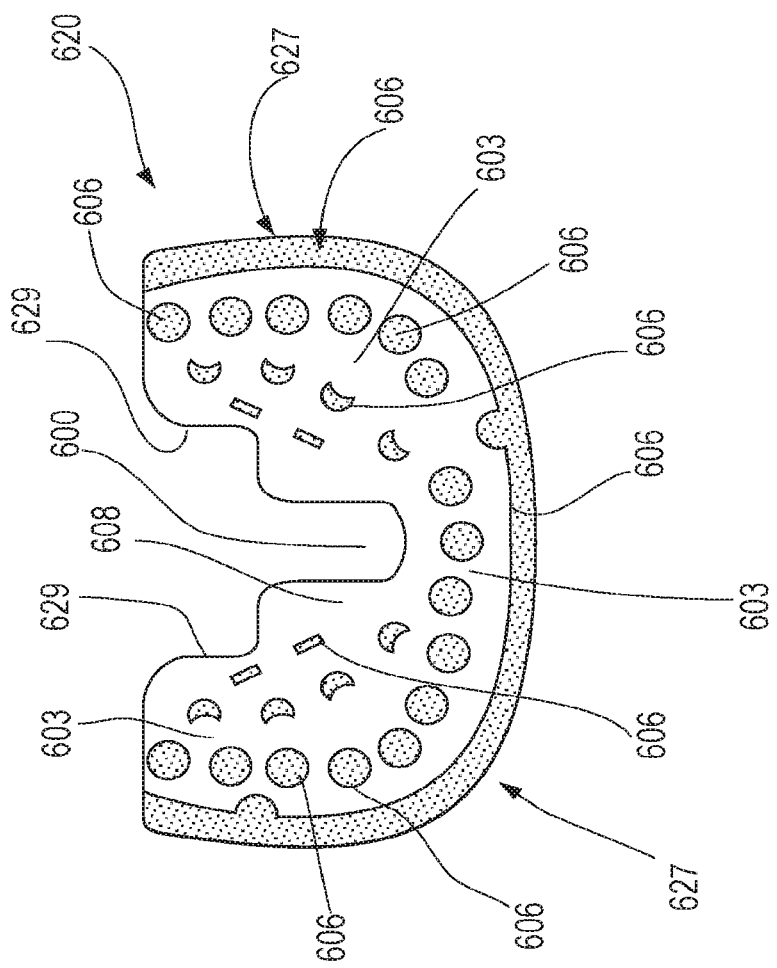

KNITTED COMPONENT HAVING AT LEAST ONE THERMOPLASTIC POLYMER ELEMENT

RELATED APPLICATIONS

This application is a continuation of U.S. patent application Ser. No. 16/735,272, filed Jan. 6, 2020, which is a continuation of and claims the priority to U.S. patent application Ser. No. 15/431,940, filed Feb. 14, 2017, and issued as U.S. Pat. No. 10,524,530 on Jan. 7, 2020, which claims the benefit of U.S. Provisional Application No. 62/301,436, filed Feb. 29, 2016, and also U.S. Provisional Application No. 62/295,889, filed Feb. 16, 2016. Each application listed in this paragraph is hereby incorporated by reference in its entirety.

FIELD OF THE INVENTION

The present disclosure generally relates to uppers for articles of footwear and methods for manufacturing the uppers.

BACKGROUND

Conventional articles of footwear generally include an upper and a sole structure attached to the upper. The materials selected for the upper vary significantly between different styles of footwear, but often include a textile material. Athletic footwear, for example, generally includes an upper having a textile that is stitched or adhesively bonded to a thermoset foam layer. Similarly, hiking boots and work boots often include a durable outer shell formed of leather and an inner lining formed of a textile joined with foam materials.

Various methods are utilized to manufacture the uppers. The particular manufacturing method is often chosen based on the intended use of the article of footwear. Some uppers are manufactured using a knitting process. Once a knit upper is formed, further processing steps may take place depending upon the intended use of the knit upper. For example, if the knit upper is to be used in connection with a soccer shoe, a film or other external component may be bonded to the toe area of the upper for better ball control.

BRIEF SUMMARY

The present disclosure generally relates to uppers for articles of footwear and methods of manufacturing the same. In one aspect, an upper for an article of footwear comprises a plurality of molded thermoplastic polymer elements linked together by a knit element. Each of the plurality of molded thermoplastic polymer elements is discrete or substantially discrete. Each of the plurality of molded thermoplastic polymer elements comprises a border and the border is substantially or fully surrounded by the knit element.

In an additional aspect, an upper for an article of footwear comprises a plurality of knit elements linked together by a molded thermoplastic polymer element. Each of the plurality of knit elements is discrete or substantially discrete. Each of the plurality of molded thermoplastic polymer elements comprises a border and the border is substantially or completely surrounded by the molded thermoplastic polymer element.

In a further aspect, a method of forming an upper for an article of footwear comprises knitting the upper with a first yarn comprising a thermoplastic polymer and a second yarn comprising polyester. The upper comprises a first side and a second side opposite the first side. The first side comprises the first yarn and the second side comprises the second yarn. The method also includes a step of placing the upper in a heated mold for a period of time to melt at least a portion of the thermoplastic polymer in at least two discrete or substantially discrete locations on the upper. Finally, the upper may be cooled to solidify the melted portions and thereby form a plurality of molded thermoplastic polymer elements.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific aspects disclosed may be readily utilized as a basis for modifying or designing other aspects for carrying out the same purposes of the present disclosure. It should also be realized by those skilled in the art that such equivalent aspects do not depart from the spirit and scope of the disclosure as set forth in the appended claims.

BRIEF DESCRIPTION OF THE DRAWINGS

A detailed description of the invention is hereafter described with specific reference being made to the drawings in which:

FIG. 6 shows an upper for an article of footwear in accordance with certain aspects of the present disclosure.

DETAILED DESCRIPTION

Figure 1:
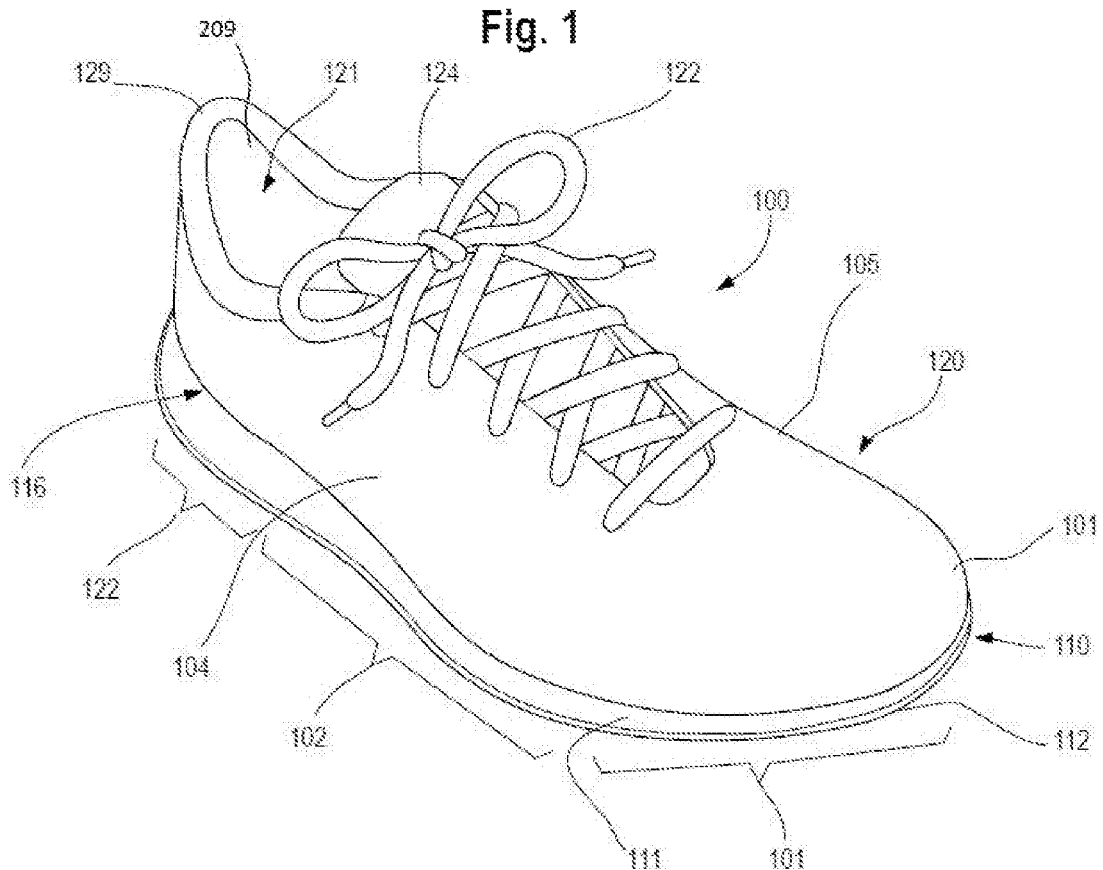
FIG. 1 shows an article of footwear in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It should be understood that the drawings are not necessarily to scale, and in certain instances details may have been omitted that are not necessary for an understanding of aspects disclosed herein, such as conventional fabrication and assembly.

I. Uppers for Articles of Footwear

Certain aspects of the present disclosure relate to uppers configured for use in an article of footwear. The uppers may be used in connection with any type of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The uppers may also be incorporated into non-athletic shoes, such as dress shoes, loafers, and sandals. Again, the uppers disclosed herein may be used in connection with any type of footwear or shoe.

With respect to FIG. 1, an article of footwear is generally depicted comprising a sole (110) and an upper (120). The upper (120) comprises a lateral side (104), a medial side (105), and a heel portion (122). The area of the shoe where the sole (110) joins the outer edge of the upper (120) may be referred to as the "biteline" (116). The upper (120) may be joined to the sole (110) in a fixed manner using any conventional technique, such as through the use of an adhesive.

In some aspects, the sole (110) comprises a midsole (111) and an outsole (112). The article of footwear may additionally comprise a throat area (100) and an ankle opening (121), which is surrounded by a collar (129). The upper (120) defines a void that accommodates a foot of a person wearing the article of footwear. The throat (100) is generally disposed in the mid-foot region (102) of the upper. The mid-foot region (102) is generally a section of the upper located between the ankle opening (121) and a toe portion (101).

In FIG. 1, a tongue (124) is disposed in the throat (100) of the shoe but the tongue (124) is an optional component, as are the laces (122). Although the tongue (124) depicted in FIG. 1 is a traditional tongue, the tongue (124), if included, may be any type of tongue, such as a gusseted tongue or a burrito tongue. If a tongue is not included, the lateral and medial sides of the throat (100) may be joined together, for example.

Other optional components that may be incorporated into the upper include one or more tensile strands. A tensile strand may be a yarn, a cable, a rope, or any other type of strand. A tensile strand may be flexible but it also may have a substantially fixed length measured from a first end to a second end. As such, the tensile strand can be substantially inelastic. The one or more tensile strands may extend across the upper in any direction. If the upper comprises an element formed by a knitting process, i.e. a knit element, the tensile strands can be at least partially inlaid within the knit element. The tensile strands may limit the stretch of the knit element. Also, in some aspects, portions of the tensile strands may be exposed from knit element. For example, portions of the tensile strands may extend out of the knit element in the throat region to form loops that can retain shoe laces. See, for example, U.S. Patent Application Publication No. 2015/0359290, U.S. Patent Application Publication No. 2014/0237861, and U.S. Pat. No. 9,145,629, which are incorporated into the present application in their entirety.

Figure 2:
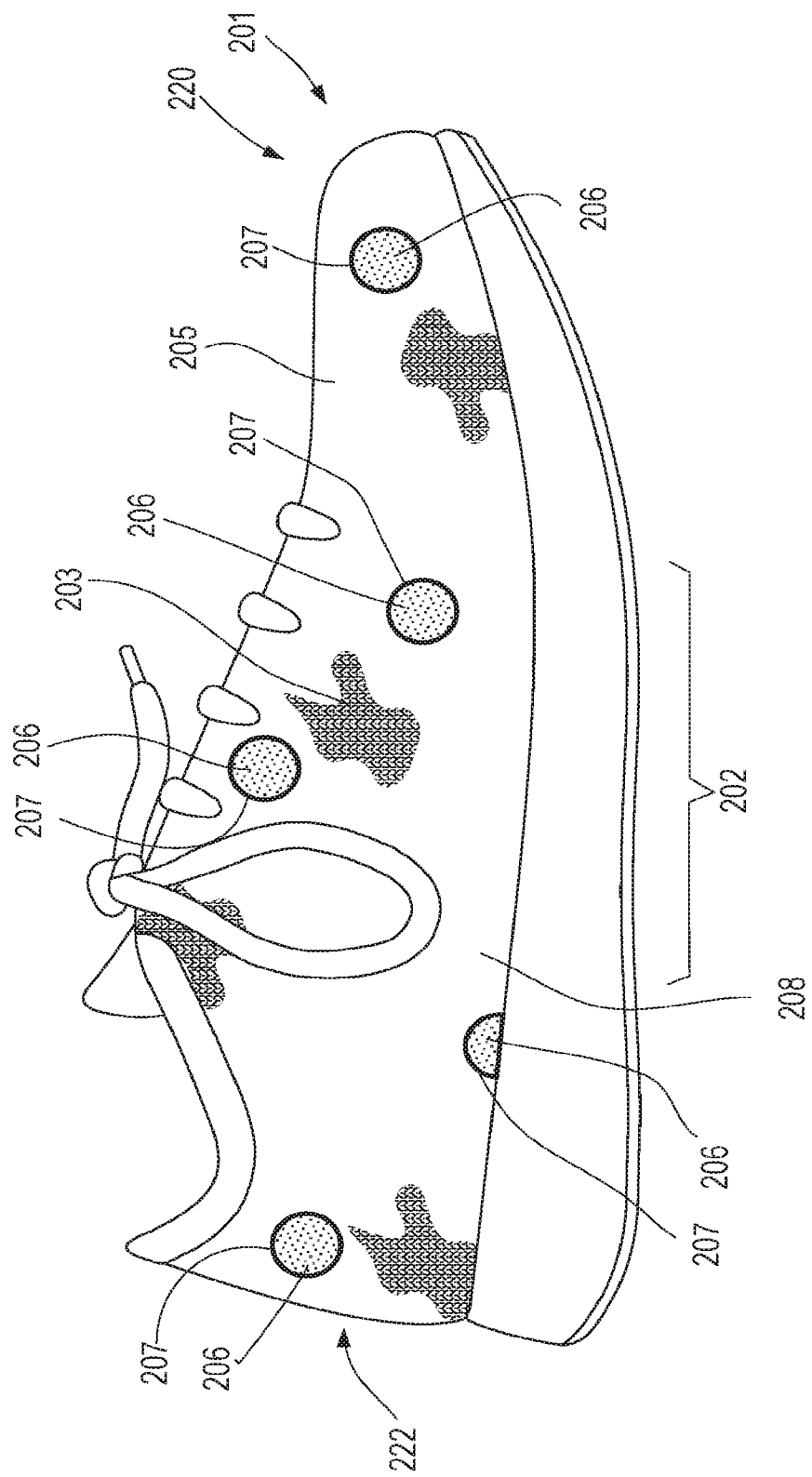
FIG. 2 shows an article of footwear including a knit element and a plurality of molded thermoplastic polymer elements.

According to FIG. 2, an upper (220) may comprise two or more discrete or substantially discrete elements. For example, the upper (220) comprises a knit element (203) and a plurality of molded thermoplastic polymer elements (206). In general, the term "plurality" is defined as meaning "more than one". For example, a plurality of molded thermoplastic polymer elements may include any number of molded thermoplastic polymer elements greater than one, such as from about 2 to about 300, including any number therebetween, such as about 10, about 20, about 30, about 40, about 50, about 100, about 200, etc. In some aspects, a plurality may include more than 300 elements.

The molded thermoplastic polymer elements (206) may be incorporated or disposed anywhere on the upper (220), such as the toe portion (201), the mid-foot region (202), the heel portion (222), the medial side (205), and/or the lateral side (not shown), for example.

Although FIG. 2 depicts each molded thermoplastic polymer element (206) as a circle or partial circle, each molded thermoplastic polymer element (206) may comprise any desired shape. The molded thermoplastic polymer elements (206) may all comprise the same shape or one or more of the elements may comprise certain shapes and one or more of the molded thermoplastic polymer elements may comprise different shapes. Any geometrical shape is intended to be covered by the present disclosure. Illustrative, non-limiting examples include triangles, quadrilaterals, such as diamonds, regular and/or irregular polygons, circles, ellipses, and crescents. The molded thermoplastic polymer elements may also take the shape of any letter, number, or symbol, for example.

The shape of each molded thermoplastic polymer element comprises a border/perimeter (207). The border (207) is at least partially surrounded by, or substantially surrounded by, the knit element (203). The knit element (203) is attached to each molded thermoplastic polymer element at one or more locations along the border (207).

Each of the plurality of molded thermoplastic polymer elements (206) is linked together by the knit element (203). That is, the knit element (203) is disposed between, and connected to, each molded thermoplastic polymer element (206). Each of the plurality of molded thermoplastic polymer elements (206) is discrete or substantially discrete. In some aspects, the knit element does not comprise any of the molded thermoplastic polymer(s).

In some aspects, the upper may comprise a first side and a second side opposite the first side. For example, in FIG. 2, the first side (208) may be the outward-facing side and the second side (not shown) may be the inward-facing side, which faces the foot of a person wearing the shoe. As shown in FIG. 2, the first side (208) comprises the plurality of molded thermoplastic polymer elements (206). In other aspects, the second side may additionally or alternatively comprise a plurality of molded thermoplastic polymer elements (206).

In FIG. 2, the first side (208) comprises a knit element (203) and the second side may comprise a second knit element. That is, both the first side of the upper and the second side of the upper may be formed using a knitting process. In some aspects, the upper may comprise multiple layers. For example (and referring to FIG. 1), the upper may comprise a first layer (209) and a second layer (211). The first layer (209) may comprise the first side and the second layer (211) may comprise the second side. The layers may be attached to one another. For example, each layer has an outer-edge/perimeter. The layers may be attached to each other along the outer-edge. In some aspects, the layers are only attached to each other at the outer-edges. In some aspects, the second knit element may comprise a tighter knit structure as compared to the knit element (203).

Any type of yarn may be used to form any portion of the upper (220), such as the knit element (203) and/or the second knit element. Any number of yarns may be used. In certain instances, a yarn may comprise a single filament. In other cases, a yarn may comprise two or more filaments, such as two, three, four, five, six, or more filaments associated with one another. The filaments may be associated with one another by, for example, twisting them together to form a yarn that may be used to form any portion of the upper, such as the knit element (203) or the second knit element.

Illustrative, non-limiting examples of types of yarns that may be used to form the knit element and/or the second knit element include yarns comprising thermoset polymeric materials and natural fibers, such as cotton, silk, and wool. One specific example is a polyester yarn. When subjected to moderate levels of heat, thermoset polymeric materials tend to remain stable. Moreover, when subjected to elevated levels of heat, thermoset polymeric materials and natural fibers may burn or otherwise degrade or decompose. As such, thermoset polymeric materials generally always remain in a permanent solid state. In some aspects, the melting point or decomposition temperature of at least a portion of a yarn used to form the knit element and/or the second knit element is greater than about 140° C., based on one atmosphere pressure.

One or more yarns used to form the knit element and/or the second knit element may comprise polyester. In some aspects, the yarn used to form the knit element and/or the second knit element may comprise an elastomeric filament. In still further aspects, the yarn used to form the knit element and/or the second knit element may comprise polyester and an elastomeric filament. The yarn may comprise any ratio of polyester to elastomeric filament, such as from about 95:5 to about 5:95, and any ratio therebetween. For example, if a yarn comprises four filaments, three of those filaments may comprise polyester and the fourth filament may be an elastomeric filament. In some aspects, the first side of the upper comprises the plurality of molded thermoplastic polymer elements and excludes the elastomeric filament. In some aspects, the second side of the upper excludes the plurality of molded thermoplastic polymer elements and includes an elastomeric filament.

The elastomeric filament may comprise, for example, a polyurethane containing polymer, such as spandex. Spandex is a synthetic polymeric fiber. It may comprise soft and rubbery segments of polyester or polyether polyols that allow the fiber to stretch and then recover to its original shape. Hard segments, which may comprise urethanes or urethane-ureas, provide rigidity and impart tensile strength.

In certain aspects, the yarn used to form the knit element and/or the second knit element may comprise a thermoplastic polymer. Illustrative, non-limiting examples of thermoplastic polymers include polyurethanes, polyamides, polyolefins and nylons. In contrast to thermoset polymeric materials, thermoplastic polymers melt when heated and return to a solid state when cooled. More particularly, a thermoplastic polymer transitions from a solid state to a softened or liquid state when subjected to temperatures at or above its melting point, and then the thermoplastic polymer transitions from the softened or liquid state to a solid state when sufficiently cooled below its melting point.

In accordance with the present disclosure, the melting temperature of the thermoplastic polymer may be less than a melting temperature or a decomposition temperature of at least a portion of another yarn and/or filament present in the knit structure. For example, the knit structure may include a first yarn comprising a thermoplastic polymer and a second yarn comprising polyester. The thermoplastic polymer may have a melting temperature less than the melting temperature or decomposition temperature of the polyester. Additionally, the knit structure may comprise a yarn (or a filament of the yarn) with a polyester core and a thermoplastic polymer sheath. The thermoplastic polymer of the sheath may have a melting temperature less than the melting temperature or decomposition temperature of the polyester core. The melting temperature of the thermoplastic polymer may be, for example, between about 80° C. and about 140° C., such as from about 100° C. to about 125° C., based on one atmosphere pressure.

In certain aspects, the knit element and/or the second knit element may include more than one yarn comprising a thermoplastic polymer. Optionally, a yarn may comprise more than one thermoplastic polymer and each thermoplastic polymer may have a different melting temperature. Additionally, if the knit element and/or the second knit element comprise more than one yarn, each yarn may comprise a thermoplastic polymer or each yarn may comprise any combination of thermoplastic polymers.

Figure 4A:
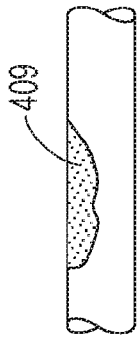
FIGS. 4A-4C show different types of yarn and yarn configurations that may be used to create an upper in accordance with the present disclosure.
Figure 4B:
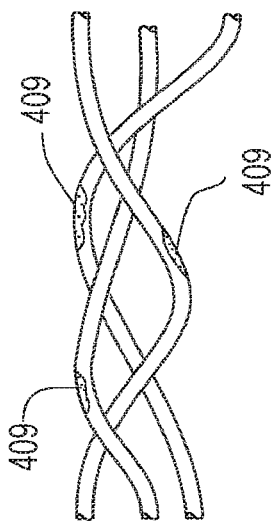
Figure 4C:
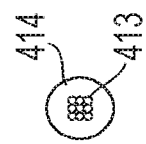

When referring to a yarn comprising a thermoplastic polymer, it should be understood that any portion of the yarn may comprise the thermoplastic polymer or the entire yarn may comprise the thermoplastic polymer. In FIG. 4A, the thermoplastic polymer (409) is disposed on an outer surface of the yarn and/or on an outer surface of a filament of the yarn. In FIG. 4B, the yarn comprises a plurality of filaments twisted together and one of the filaments comprises a thermoplastic polymer (409). In FIG. 4C, a cross-section of a coated yarn is shown having "core" (413) and a "sheath" (414). The core comprises one or more yarn filaments and the sheath comprises a thermoplastic polymer. The thermoplastic polymer comprises a lower melting temperature than at least one of the one or more filaments. The sheath (414) may be disposed along any length of the yarn, such as the entire length of the yarn or along only certain sections of the yarn. Additionally, if the yarn comprises a plurality of filaments, the sheath may be disposed along the entire length of at least one of the filaments or it may be disposed along only certain sections of the length of at least one of the filaments. The thickness of the sheath (414) is not particularly limited and can be selected depending upon the desired application of the yarn.

The first side of the upper disclosed herein may comprise any ratio of knit element to molded thermoplastic polymer elements. For example, the first side may comprise from about 5% to about 95% of the knit element and from about 95% to about 5% of the plurality of molded thermoplastic polymer elements. If any of the plurality of molded thermoplastic polymer elements are located on the second side of the upper, similar ratios may apply to the second side as well.

As noted above, each of the plurality of molded thermoplastic polymer elements comprises a shape with a border/perimeter. The border is fully or substantially surrounded by a portion of the knit element and/or the second knit element. The shape may have an outer surface and the outer surface may be smooth, textured, or any combination thereof. Within the border, the outer surface may consist of molded thermoplastic polymer or it may include one or more yarns or filaments. For example, if a molded thermoplastic polymer element comprises a thermoplastic polymer and a polyester yarn (or some other yarn that has not at least been partially melted and solidified), the ratio of these two components can be from about 5:95, about 10:90, about 20:80, about 30:70, about 40:60, about 50:50, about 60:40, about 70:30, about about 90:10, and about 100:0.

Figure 3:
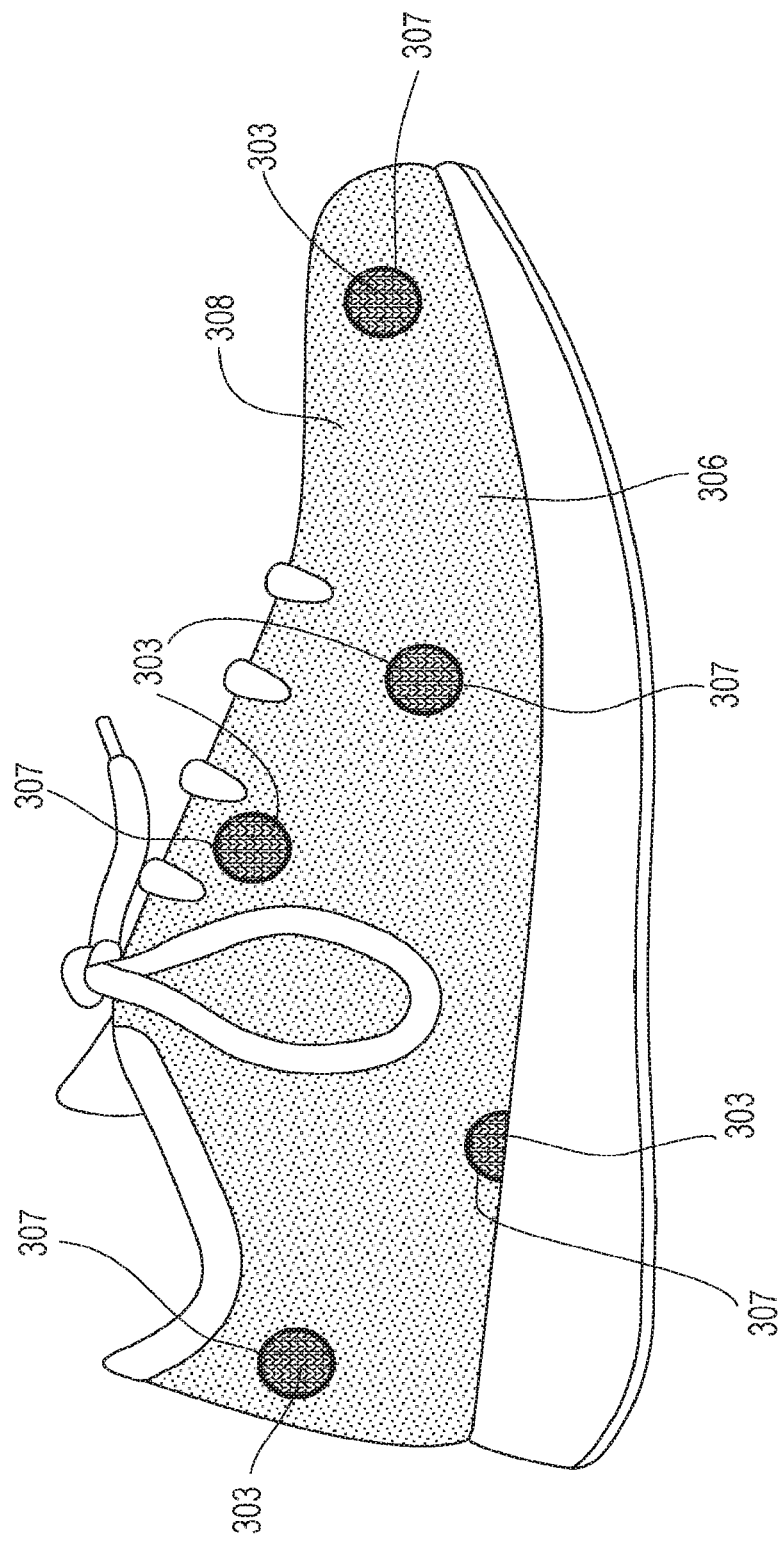
FIG. 3 shows an article of footwear including a molded thermoplastic polymer element and a plurality of knit elements.

While the upper has been described as having a knit element and a plurality of molded thermoplastic polymer elements, a different structure is also contemplated by the present disclosure. As can be seen in FIG. 3, an upper may comprise a plurality of knit elements (303) linked together by a molded thermoplastic polymer element (306). Each of the plurality of knit elements (303) is discrete or substantially discrete. Additionally, each of the plurality of knit elements (303) comprises a border (307) at least partially surrounded by, or substantially surrounded by, the molded thermoplastic polymer element (306).

The upper in FIG. 3 comprises a first side (308) and a second side opposite the first side (not shown). The first side may comprise the molded thermoplastic polymer element (306). The second side may comprise an elastomeric filament. The elastomeric filament may comprise a polyurethane polymer, such as spandex. In some aspects, the first side (308) excludes the elastomeric filament. In some aspects, the second side excludes the molded thermoplastic polymer element (306). The plurality of knit elements (303) may comprise a polyester yarn and optionally an elastomeric filament. The upper may comprise from about 5% to about 95% of the plurality of knit elements and from about 95% to about 5% of the molded thermoplastic polymer element. In some aspects, the first side comprises the plurality of knit elements and the second side comprises a second knit element. The second knit element may have a tighter knit structure than at least one of the plurality of knit elements.

II. Knitting Process

Certain aspects of the present disclosure relate to methods of manufacturing uppers for articles of footwear. In some aspects, the uppers may be formed using a knitting process. One or more portions of the upper may be formed using a knitting process or the entire upper may be formed using a knitting process. Various knitting techniques may be employed to form the uppers, or portions thereof, and all knitting techniques are intended to be covered by the present disclosure. Illustrative, non-limiting examples of knitting techniques include hand knitting, warp knitting (where the yarn usually runs in the direction of the wales or follows the direction of the wales), weft knitting (where the yarn usually runs in the direction of the courses), flat knitting, wide tube circular knitting, narrow tube circular knit jacquard, single knit circular knit jacquard, and double knit circular knit jacquard.

The upper may be knitted with any number of yarns and any types of yarns. Illustrative examples of yarn types have been previously set forth in this application and include yarns comprising thermoset polymeric materials and natural fibers, such as cotton, silk, and wool, yarns comprising one or more elastomeric filaments, yarns comprising water-repellant coatings, and yarns comprising one or more thermoplastic polymers.

In some aspects, the upper is formed by knitting with a first yarn comprising a thermoplastic polymer and a second yarn comprising an elastomeric filament. As shown and previously described in connection with FIGS. 1-3, the upper may be knitted such that it includes a first side and a second side opposite the first side. In some aspects, the first side comprises the first yarn and the second side comprises the second yarn. The first side may also include additional yarns, such as the second yarn and/or a third yarn. The second and/or the third yarn may comprise, for example, polyester. In some aspects, the first side may be knitted such that it excludes the second yarn or any yarn comprising an elastomeric filament. In some aspects, the second side may be knitted with additional yarns, such as the first yarn and/or a yarn comprising polyester. In other aspects, the second side may be knitted such that it excludes the first yarn or any yarn comprising a thermoplastic polymer.

In some aspects, a yarn comprising a thermoplastic polymer is used to knit the first side of the upper. As the first side of the upper is knitted, the amount of the thermoplastic polymer present on the first side of the upper may increase or decrease moving from an outer edge of the upper towards a throat area and/or a collar area of the upper. For example, after formation of the upper, an outer edge of the first side of the upper may fully or substantially comprise a thermoplastic polymer, a portion of the first side of the upper between the outer edge and the throat and/or collar area may comprise a reduced amount of the thermoplastic polymer, and the throat and/or collar area of the first side of the upper may comprise even less of the thermoplastic polymer or no thermoplastic polymer at all. The foregoing explanation also applies to an aspect wherein the second side of the upper comprises a thermoplastic polymer. Such a knitting configuration may be used to form a gradient on one or both sides of the upper, as is more fully described below.

In addition to the first and second yarns, the upper may be knitted with additional yarns, such as a third yarn, a fourth yarn, a fifth yarn, etc. These additional yarns may be any type of yarn described herein or any other type of yarn. For example, the upper may comprise a third yarn. The third yarn may comprise polyester, for example. In some aspects, the third yarn may be knitted on the first side of the upper and/or the second side of the upper.

In one particular aspect, a yarn comprising a thermoplastic polymer is knitted on the first side of the upper. This yarn may also comprise another material, such as polyester, and it may exclude certain materials, such as elastomeric filaments. An additional yarn may be knitted on the first side of the upper comprising, for example, polyester, and this yarn may exclude a thermoplastic polymer in some aspects. This yarn may also exclude an elastomeric filament in some aspects. An additional yarn comprising an elastomeric filament may be knitted on the second side of the upper. This yarn may comprise other materials, such as polyester. This yarn may exclude a thermoplastic polymer in some aspects. An additional yarn comprising, for example, polyester, may be knitted on the second side of the upper and this yarn may exclude a thermoplastic polymer in some aspects.

At least a portion of the knit element may have a different structure than at least a portion of the second knit element. For example, in some aspects, the second side of the upper may comprise a tighter knit structure than the first side. Such a configuration may be achieved by, for example, knitting the second side with a greater tension on the yarn(s) than the tension applied to the yarn(s) when knitting the first side.

After formation of the upper, the upper may be subjected to a number of post-processing techniques including, but not limited to, steaming, molding, and/or cooling. In some aspects, after formation of the upper, the upper may be exposed to steam. Applying steam to the upper allows certain yarns to "set," such as a polyester yarn, and allows other yarns to shrink, such as the yarns comprising the elastomeric filament. The degree to which the elastomeric yarn shrinks is not limited and is some instances, the yarn may shrink between 10% and 50% of its original length. In some cases, the length of the yarn may shrink less than 10% of its original length and in other cases, the yarn may shrink more than 50% of its original length, the original length being the length before the steam is applied. In some aspects, the upper is exposed to steam at a temperature from about 85° C. to about 105° C. for about 25 seconds to about 45 seconds. Higher or lower temperatures may be used and the length of exposure may be longer than 45 seconds or shorter than 25 seconds. Although exposing the upper to steam has been described as one possible method that may be employed to shrink and set various yarns, other techniques may be employed.

In accordance with various aspects disclosed herein, the upper may be processed using a heated mold. In some aspects, this step may occur after the upper has been exposed to steam. The upper may be disposed in a heated mold and the heat from one or more surfaces of the mold may cause one or more thermoplastic polymers of the yarn(s) to melt or at least partially melt.

The first side of the upper and/or the second side of the upper may be exposed to the heat of the heated mold. The temperature at or near a surface of the heated mold may be higher than a melting point of at least one of the thermoplastic polymers and thus, when a surface of the heated mold contacts or comes into close proximity with one or more of the thermoplastic polymers, one or more of those thermoplastic polymers may melt or at least partially melt.

If it is desirable to melt the thermoplastic polymer, or a portion thereof, on the first side of the upper, then one or more yarns comprising one or more thermoplastic polymers may be knitted on at least a portion of the first side of the upper. If it is desirable to melt the thermoplastic polymer, or a portion thereof, on the second side of the upper, then one or more yarns comprising one or more thermoplastic polymers may be knitted on at least a portion of the second side of the upper. Regardless of the location of the thermoplastic polymer(s), the entire upper may be heated by the mold or certain portions of the upper may be selectively heated by the mold and, if the temperature of the heat is higher than the melting temperature of the thermoplastic polymer(s), the thermoplastic polymer(s) will melt or at least partially melt to form a fused area.

Selective heating can be carried out using, for example, one or more masks. One or more masks may be disposed on one or more portions of a surface of the upper before the upper is exposed to the heat of the heated mold. The thermoplastic polymer(s) on one or more portions of the upper covered by the masks will not melt when placed in the heated mold.

When heated above its melting temperature, and not covered by a mask, the thermoplastic polymer will soften or melt, which could potentially release sections of the knit structure. That is, the melting or softening of the thermoplastic polymer material of the fusible yarn may allow the knit structure to unravel, become non-cohesive, or otherwise release because the fusible yarn is no longer forming loops that hold the knit structure together. Various solutions to this potential problem are known and all are considered to be within the scope of the present disclosure.

For example, if a first fusible yarn is utilized that comprises a first thermoplastic polymer and a second fusible yarn is utilized that comprises a second thermoplastic polymer, and the temperature of the heat applied to the knit structure is above the melting temperature of first thermoplastic polymer but below the melting temperature of the second thermoplastic polymer, the second yarn will remain intact and effectively hold the knit structure together.

An additional example of ensuring that melting or softening the thermoplastic polymer of the yarn does not release the knit structure is to utilize a yarn comprising a plurality of filaments, wherein at least one of the filaments comprises a non-fusible material or a thermoplastic polymer that has a melting temperature above the temperature applied to the knit structure by the heated mold. Similarly, a yarn or filament can be used that includes a non-fusible core material, such as polyester, surrounded by a sheath comprising a thermoplastic polymer. Likewise, a yarn or filament can be used that includes a core and a sheath, wherein the core comprises a first thermoplastic polymer and the sheath comprises a second thermoplastic polymer. In this aspect, the first thermoplastic polymer should have a melting temperature higher than a melting temperature of the second thermoplastic polymer and the temperature of the heat applied to the yarn or filament by the heated mold should be below the melting temperature of the first thermoplastic polymer.

The upper may be placed into the heated mold for a period of time to melt at least a portion of the thermoplastic polymer in at least two discrete locations on the upper. In some aspects, one or more surfaces of the heated mold may comprise a temperature between about 115° C. and about 140° C. The upper may remain in the heated mold for any desired length of time, such as from about 10 to about 20 seconds. The amount of pressure applied to the upper by one or more surfaces of the heated mold may be selected depending at least upon the desired characteristics of the upper. In some aspects, the amount of pressure may be from about 1 kg/cm2 to about 100 kg/cm2, or any amount therebetween. In other aspects, the amount of pressure may be less than 1 kg/cm2 or more than 100 kg/cm2.

In one particular aspect, the temperature of at least one surface of the heated mold may be between about 110° C. and about 130° C., such as from about 116° C. to about 120° C. The upper is subjected to the heat of the mold for an amount of time between about 5 and about 15 seconds, such as about 10 seconds. The pressure applied to the upper by at least one surface of the heated mold may be an amount between about 50 kg/cm2 and about 70 kg/cm2, such as about 60 kg/cm2. Using these parameters, and an optional subsequent cooling step, an upper may be formed comprising one or more molded thermoplastic polymer elements that have a "matte" look (as opposed to a "shiny" look).

In another exemplary aspect, the temperature of at least one surface of the heated mold may be between about 120° C. and 140° C., such as from about 126° C. to about 130° C. The upper is subjected to the heat of the mold for an amount of time between about 10 seconds and about 20 seconds, such as about 15 seconds. The pressure applied to the upper by at least one surface of the heated mold may be an amount between about 1 kg/cm2 and about 10 kg/cm2, such as about 6 kg/cm2. Using these parameters, and an optional subsequent cooling step, an upper may be formed comprising one or more molded thermoplastic polymer elements that have a "shiny" look (as opposed to a "matte" look).

Figure 5A:
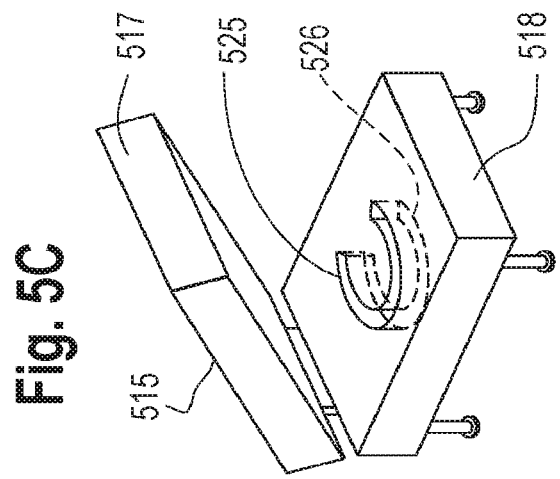
FIGS. 5A-5C show different types of heated molds that may be used the melt a thermoplastic polymer.
Figure 5B:
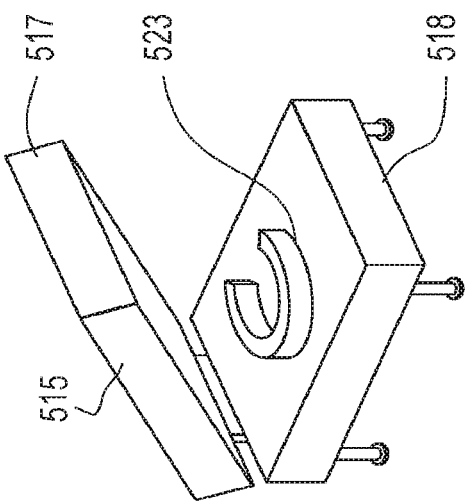
Figure 5C:
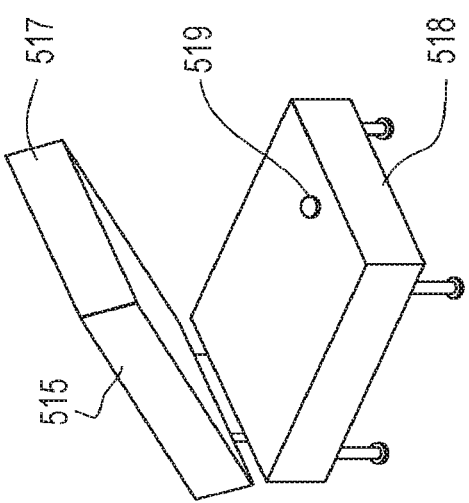

FIGS. 5A-5C generally depict a heat press (515), which is an example of a heated mold. The heat press (515) may comprise a top plate (517) and a bottom plate (518). Each of these plates has a surface that may or may not contact a side of the upper. The materials used to form the plates are not limited. In some aspects, the plates may comprise a metal and/or silicone. In one aspect, the bottom plate (518) comprises silicone and the top plate (517) comprises a metal.

An upper may be disposed on the bottom plate (518) and the top plate (517) may be lowered until a surface thereof contacts the upper. An amount of pressure may be applied by the top plate and since the bottom plate is stationary, the upper is at least partially compressed. In some aspects, after the top plate is lowered to contact the upper, the top plate and the bottom plate remain separated and do not contact each other.

In FIG. 5A, the bottom plate (518) of the heat press comprises a stopper (519). The shape of the stopper (519) is not limited. The stopper (519) may comprise any material, such as rubber or metal. If the material used to form the stopper (519) has a melting temperature, the melting temperature should be above the temperature given off by the plate(s) of the heat press. One purpose of the stopper (519) is to prevent the top plate (517) from contacting the bottom plate (518) when the top plate (517) is lowered. In some aspects, the height of the stopper (519) is substantially the same as the height of the upper. In other aspects, the height of the stopper (519) is less than the height of the upper. In still further aspects, the height of the stopper (519) may be greater than the height of the upper. When the upper is disposed on the bottom plate (518) of the heat press (515), it may be located thereon such that no part of the upper contacts the stopper (519).

For example, the height of the stopper (519) may be about 5.5 mm and the height of the upper may be about 6 mm. In this example, when the upper is disposed on the bottom plate (518) of the heat press (515), a top side of the upper rises about 0.5 mm above the stopper (519). When the top plate (517) of the heat press (515) is closed (lowered), a surface of the top plate (517) contacts a top surface of the upper and as a result of the applied pressure, the height of the upper is reduced, such as by about 0.5 mm, until the top plate (517) cannot be lowered any further due to resistance given by the stopper (519). Since the stopper (519) is present, the top plate (517) is not able to contact the bottom plate (518), thereby preventing the upper from flattening and allowing the upper to achieve a quilted structure.

In FIG. 5B, the bottom plate (518) comprises a jig (523). The jig (523) may be a separate element that is disposed on the bottom plate (518) of the heat press (515). The jig (523) may be formed using any materials, such as rubber or metal. If the material used to form the jig (523) has a melting temperature, the melting temperature should be above the temperature given off by the plate(s) of the heat press. The shape of the jig (523) is not limited. In FIG. 5B, the shape of the jig (523) is substantially the same as the shape of an upper. The jig (523) is configured to accommodate or receive the upper. That is, the jig (523) comprises a three-dimensional shape defined by a wall that has a particular height. The upper may be placed within the wall of the jig (523). The jig (523) may only comprise a wall formed into a particular shape or the jig (523) may optionally comprise a bottom surface and/or a top surface. The bottom surface may contact the bottom plate (518) of the heat press (515) and the top surface may contact the top plate (517) of the heat press (515).

One purpose of the jig (523) is to prevent the top plate (517) from contacting the bottom plate (518) when the top plate (517) is lowered. In some aspects, the height of the wall of the jig (523) is substantially the same as the height of the upper. In other aspects, the height of the wall of the jig (523) is less than the height of the upper. In still further aspects, the height of the wall of the jig (523) may be greater than the height of the upper.

For example, the height of the wall of the jig (523) may be about 5.5 mm and the height of the upper may be about 6 mm. In this example, when the upper is disposed within the wall of the jig (523) on the bottom plate (518) of the heat press (515), a top side of the upper rises about 0.5 mm above the wall of the jig (523). When the top plate (517) of the heat press (515) is closed (lowered), a surface of the top plate (517) contacts a top surface of the upper and as a result of the applied pressure, the height of the upper is reduced, such as by about 0.5 mm, until the top plate (517) cannot be lowered any further due to resistance given by the wall of the jig (523). Since the jig (523) is present, the top plate (517) is not able to contact the bottom plate (518), thereby preventing the upper from flattening and allowing the upper to achieve a quilted structure.

In FIG. 5C, a heat press (515) is depicted having a top plate (517) and a bottom plate (518) comprising a recess (525). The shape of the recess (525) is not limited. In FIG. 5C, the shape of the recess (525) is substantially the same as the shape of an upper. The recess (525) is configured to accommodate or receive the upper. That is, the recess (525) comprises a three-dimensional shape defined by a wall that has a particular height. The recess (525) also comprises a bottom surface (526) that contacts a bottom surface of the upper. The upper may be placed within the wall of the recess (525). In some aspects, the height of the wall of the recess (measured from the bottom surface of the recess to the top of a wall of the recess) is substantially the same as the height of the upper. In other aspects, the height of the wall of the recess (525) is less than the height of the upper. In still further aspects, the height of the wall of the recess (525) may be greater than the height of the upper.

For example, the height of the wall of the recess (525) may be about 5.5 mm and the height of the upper may be about 6 mm. In this example, when the upper is disposed within the wall of the recess (525), a top side of the upper rises about 0.5 mm above the wall of the recess (525). When the top plate (517) of the heat press (515) is closed (lowered), a surface of the top plate (517) contacts a top surface of the upper and as a result of the applied pressure, the height of the upper is reduced, such as by about 0.5 mm, until the top plate (517) cannot be lowered any further due to resistance given by the top surface of the bottom plate (518). Since the recess (525) is present, the upper is not able to be completely flattened or substantially flattened, thereby allowing the upper to achieve a quilted structure.

While a heat press has been given as an example of a heated mold, other examples of heated molds are contemplated by the present disclosure and other methods of heating the upper are also contemplated by the present disclosure, such as infrared heating, ultrasonic heating, high frequency heating, induction heating, radio frequency heating, vibration heating, and steam heating.

The methods disclosed herein may also comprise a cooling step. The cooling step may occur after the upper has been removed from the heated mold. During the cooling step, any melted/fused thermoplastic polymer will solidify and thereby form a molded thermoplastic polymer element. If the upper is knitted such that various discrete locations on the upper comprise a thermoplastic polymer that has been melted and subsequently solidified, the upper will comprise a plurality of molded thermoplastic polymer elements.

Each molded thermoplastic polymer element is derived from a knit structure. The upper initially comprises one or more knit structures that include a thermoplastic polymer. The thermoplastic polymer is melted, thereby transforming that portion of the knit structure into a fused area. Cooling the fused area results in the formation of a molded thermoplastic polymer element. Such a configuration contrasts with, and has significant advantages over, a configuration wherein a polymeric film or some other external component is bonded to a knit structure. For example, when bonding an external component to a knit upper, the external component may peel away with time and/or use of the upper. Such a problem is avoided when the molded thermoplastic polymer element derives from the knit structure.

In some aspects, the cooling step comprises exposing the upper to a temperature between about 20° C. and about 24° C. Lower temperatures can be used to cool the upper and higher temperatures could be used as well, assuming the temperature does not rise above the melting temperature of the thermoplastic polymer. Any devices or techniques may be used to cool the upper. In some aspects, a cold press may be used to cool the upper. The upper may remain in the cold press for any period of time necessary to cool and solidify the melted thermoplastic polymer. In some aspects, the upper may remain in the cold press between about 5 seconds and about 20 seconds, such as from about 12 seconds to about 15 seconds. In some aspects, the cold press may have a configuration similar to the heat press described above. If such a cold press is used, the pressure applied to the upper by the plates of the cold press may be between about 1 kg/cm2 and about 2.1 kg/cm2, such as about 1.5 kg/cm2. The plates of the cold press may comprise any suitable materials, such as plastics, rubbers, and metals. In one aspect, the bottom plate comprises silicone and the top plate comprises a metal.

After the upper is sufficiently cooled, it may comprise a plurality of molded thermoplastic polymer elements and a knit element on at least one side. For example, the upper depicted in FIG. 6 comprises a plurality of molded thermoplastic polymer elements (606) and a knit element (603) on a first side (608). The upper also comprises a second side, which is not shown. As can be seen in FIG. 6, the knit element (603) links together each of the plurality of molded thermoplastic polymer elements (606). The upper may undergo additional processing steps and/or it may be attached to a sole to form an article of footwear.

In some aspects, the upper may be knitted to include multiple layers. For example, by knitting on both a front bed and a back bed of a knitting machine, an upper can be created comprising a first layer and a second layer. The second layer may have the same configuration as the first layer or it may have a different configuration. For example, the first layer may comprise a plurality of molded thermoplastic polymer elements linked together by a knit element and the second layer may comprise a second knit element. The layers may be connected to each other with a yarn along the outer edge (627) of the layers. In some aspects, the layers are only connected to each other at one or more locations along the outer edge (627).

In some aspects, the yarn(s) comprising the thermoplastic polymer(s) can be selectively located on the upper so that after the melting and cooling steps, the upper comprises different properties in different locations. For example, with respect to FIG. 6, one side of an upper (620) is shown that has been created using a knitting process. Such an upper can be manufactured by, for example, knitting the upper with two yarns; a first yarn comprising polyester and a second yarn comprising a thermoplastic polymer. Any number of yarns may be used to create this upper (620). The upper (620) may be knitted such that the entire outer-edge (627) comprises, or substantially comprises, a thermoplastic polymer. Moving from the outer-edge (627) towards the collar (629) and/or throat (600), the upper comprises less of the thermoplastic polymer. That is, the outer edge (627) may comprise a greater amount of the thermoplastic polymer than an area of the upper located between the outer-edge (627) and the collar (629) and/or throat (600). In turn, the area between the outer-edge (627) and the collar (629) and/or throat (600) may comprise a greater amount of the thermoplastic polymer than the area of the upper directly adjacent the throat (600) and/or collar (629).

The upper of FIG. 6 may be formed by knitting the second yarn on, and adjacent to, the outer-edge (627). The first yarn may not be knitted in this area or a minor amount of the first yarn may be knitted in this area. Moving towards the throat (600) and/or collar (629), the amount of the second yarn being knitted on this side of the upper may be reduced and the amount of the first yarn being knitted on this side of the upper may be increased. With such a configuration, the upper can be said to have a gradient of thermoplastic polymer moving from the outer-edge (627) towards the throat (600) and/or collar (629). The gradient can exist in any direction across the upper.

Other properties can be imparted to the upper in accordance with the present disclosure. For example, a knit element may have a certain degree of stretchability but when that element is melted and subsequently cooled to form a molded thermoplastic polymer element, the element becomes significantly more stretch-resistant. Additionally, the molded thermoplastic polymer element may have significantly less air permeability/air flow than a knit element but, in some aspects, the molded thermoplastic polymer element may still provide some air permeability. The molded thermoplastic polymer element also generally has higher durability, stability, support, abrasion resistance, and stiffness as compared to a knit element. Further, water may be able to penetrate a knit element but a molded thermoplastic polymer element may be waterproof or at least more water-repellant than the knit element. A water-repellant structure is able to resist the penetration of water to a certain degree, but not entirely, whereas a waterproof structure is completely impenetrable by water. Additional examples of properties that can be incorporated into and/or modified in knit elements can be found in, for example, U.S. Pat. Nos. 6,931,762 and 7,347,011, both of which are incorporated by reference into the present application in their entirety.

In addition to melting yarns and using different knitting techniques, the particular type of yarn chosen can also affect the properties of the upper. For example, cotton is relatively inelastic and lightweight. Elastane and stretch polyester each provide substantial stretch and recoverability, with stretch polyester also providing recycleability. Rayon provides high luster and moisture absorption. Wool also provides high moisture absorption, in addition to insulating properties. Nylon is a durable and abrasion-resistant material with high strength. Polyester is a hydrophobic material that also provides relatively high durability. Any of these types of yarns, or other types of yarns, may be used to knit the uppers of the present disclosure.

Finally, although many of the foregoing method steps have been described in connection with forming an upper having a knit element and a plurality of molded thermoplastic polymer elements, the techniques may also be used to create an upper comprising a plurality of knit elements and a molded thermoplastic polymer element.

All of the structures and methods disclosed and claimed herein can be made and executed without undue experimentation in light of the present disclosure. While this invention may be embodied in many different forms, there are described in detail herein specific aspects of the invention. The present disclosure is an exemplification of the principles of the invention and is not intended to limit the invention to the particular aspects illustrated. In addition, unless expressly stated to the contrary, use of the term "a" is intended to include "at least one" or "one or more." For example, "a yarn" is intended to include "at least one yarn" or "one or more yarns."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various aspects described herein. It should also be understood that various changes and modifications to the aspects described herein will be apparent to those skilled in the art. Such changes and modifications can be made without departing from the spirit and scope of the invention and without diminishing its intended advantages. It is therefore intended that such changes and modifications be covered by the appended claims.

We claim:

1. An upper for an article of footwear, the upper comprising:
    a plurality of knit elements linked together by a molded thermoplastic polymer element comprising a thermoplastic polymer, each of the knit elements being discrete,
    wherein each of the knit elements comprises a border that is at least partially surrounded by the molded thermoplastic polymer element; and
    wherein the upper further comprises a first layer forming a first side and a second layer forming a second side opposite the first side, wherein the first layer includes the plurality of knit elements and the molded thermoplastic polymer element.

2. The upper of claim 1, wherein the plurality of knit elements comprises a yarn and the thermoplastic polymer has a melting temperature that is less than a melting temperature or a decomposition temperature of the yarn of the plurality of knit elements.

3. The upper of claim 1, wherein the second layer includes a yarn, and wherein the thermoplastic polymer has a melting temperature that is less than a melting temperature or a decomposition temperature of the yarn in the second layer.

4. The upper of claim 3, wherein the yarn in the second layer is a polyester yarn.

5. The upper of claim 1, wherein the second layer comprises an elastomeric filament.

6. The upper of claim 1, wherein the second layer comprises a knit element having a tighter knit structure than at least one of the plurality of knit elements in the first layer.

7. The upper of claim 1, wherein the first layer comprises a first outer-edge and the second layer comprises a second outer-edge, at least a portion of the first outer-edge being secured to at least a portion of the second outer-edge.

8. The upper of claim 7, wherein the first layer and the second layer are only attached to each other along their respective outer-edges.

9. The upper of claim 1, wherein each knit element independently comprises a shape selected from the group consisting of a triangle, a quadrilateral, a regular polygon, an irregular polygon, a circle, an ellipse, and a crescent.

10. An article of footwear comprising:
    a sole system; and
    an upper comprising:
    a plurality of knit elements linked together by a molded thermoplastic polymer element comprising a thermoplastic polymer, each of the knit elements being discrete,
    wherein each of the knit elements comprises a border that is at least partially surrounded by the molded thermoplastic polymer element; and
    wherein the upper further comprises a first layer forming a first side and a second layer forming a second side opposite the first side, wherein the first layer includes the plurality of knit elements and the molded thermoplastic polymer element.

11. The article of footwear of claim 10, wherein the plurality of knit elements comprises a yarn and the thermoplastic polymer has a melting temperature that is less than a melting temperature or a decomposition temperature of the yarn in the plurality of knit elements.

12. The article of footwear of claim 10, wherein the second layer includes a yarn, and wherein the thermoplastic polymer has a melting temperature that is less than a melting temperature or a decomposition temperature of the yarn in the second layer.

13. The article of footwear of claim 12, wherein the yarn in the second layer is a polyester yarn.

14. The article of footwear of claim 10, wherein the second layer comprises an elastomeric filament.

15. The article of footwear of claim 10, wherein the second layer comprises a knit element having a tighter knit structure than at least one of the plurality of knit elements in the first layer.

16. The article of footwear of claim 10, wherein the first layer comprises a first outer-edge and the second layer comprises a second outer-edge, at least a portion of the first outer-edge being secured to at least a portion of the second outer-edge.

17. The article of footwear of claim 16, wherein the first layer and the second layer are only attached to each other along their respective outer-edges.

18. The article of footwear of claim 10, wherein each knit element independently comprises a shape selected from the group consisting of a triangle, a quadrilateral, a regular polygon, an irregular polygon, a circle, an ellipse, and a crescent.

* * * * *